(12) United States Patent
De Smet

(10) Patent No.: US 9,151,356 B2
(45) Date of Patent: Oct. 6, 2015

(54) SPLICE FOR JOINTING STEEL CORD STRIPS ENCASED IN THERMOPLASTIC MATERIAL

(75) Inventor: Anneleen De Smet, Kruishoutem (BE)

(73) Assignee: NV BEKAERT SA, Zwevegem (BE)

( * ) Notice: Subject to any disclaimer, the term of this patent is extended or adjusted under 35 U.S.C. 154(b) by 293 days.

(21) Appl. No.: 13/637,574

(22) PCT Filed: Mar. 28, 2011

(86) PCT No.: PCT/EP2011/054673

§ 371 (c)(1),
(2), (4) Date: Sep. 26, 2012

(87) PCT Pub. No.: WO2011/120891

PCT Pub. Date: Oct. 6, 2011

(65) Prior Publication Data

US 2013/0011184 A1    Jan. 10, 2013

(30) Foreign Application Priority Data

Mar. 30, 2010 (EP) .................................... 10158296

(51) Int. Cl.
*F16G 1/12* (2006.01)
*F16G 5/10* (2006.01)
(Continued)

(52) U.S. Cl.
CPC . *F16G 1/12* (2013.01); *B29C 66/71* (2013.01); *F16G 3/10* (2013.01); *F16G 5/10* (2013.01);
(Continued)

(58) Field of Classification Search
CPC ... Y10T 403/477; Y10T 24/1664; F16G 1/12; F16G 3/10; F16G 5/10; B29C 66/71

USPC ............................................... 24/38; 403/270
See application file for complete search history.

(56) References Cited

U.S. PATENT DOCUMENTS 3,463,158 A * 8/1969 Schmitt et al. ................ 606/154
3,481,807 A   12/1969 Kanamori
(Continued)

FOREIGN PATENT DOCUMENTS

DE    39 00 911 A1    11/1989
EP    0 967 409 A1    12/1999
(Continued)

OTHER PUBLICATIONS

U.S. Appl. No. 13/637,560, filed Sep. 26, 2012, De Smet et al.
(Continued)

*Primary Examiner* — Robert J Sandy
*Assistant Examiner* — Louis Mercado
(74) *Attorney, Agent, or Firm* — Foley & Lardner LLP

(57) ABSTRACT

A splice is described for jointing thermoplastic strips that include steel cords. In the splice a splice polymer is used that is a mixture of a co-polymer and a base polymer, wherein the co-polymer is a grafted co-polymer, a block co-polymer or a random co-polymer functionalized for enabling adhesion to the steel cords. Particular about the inventive splice is that the amount of co-polymer in the base polymer is such that in a test-till-break of a splice, part of the steel cords fracture in the test while the remaining cords are pulled out of the polymer without breaking. Surprisingly, a splice with such a failure behavior results in a better overall splice strength than a splice wherein a too large amount of co-polymer is added. When too much co-polymer is added all steel cords break in the test which strangely enough leads to a lower overall strength of the splice.

18 Claims, 4 Drawing Sheets

(51) Int. Cl.
  *F16G 3/10* (2006.01)
  *B29C 65/00* (2006.01)
  *B29K 105/10* (2006.01)
  *B29K 705/12* (2006.01)
  *B29L 29/00* (2006.01)
  *B29L 31/00* (2006.01)

(52) U.S. Cl.
  CPC ......... *B29K 2105/10* (2013.01); *B29K 2705/12* (2013.01); *B29L 2029/00* (2013.01); *B29L 2031/7092* (2013.01); *Y10T 24/1664* (2015.01); *Y10T 403/477* (2015.01)

(56) References Cited

U.S. PATENT DOCUMENTS

| | | | |
|---|---|---|---|
| 4,594,386 A * | 6/1986 | Olivier | 525/66 |
| 5,021,510 A * | 6/1991 | Vroomans | 525/285 |
| 8,910,462 B2 * | 12/2014 | De Smet et al. | 57/202 |
| 2008/0163978 A1 | 7/2008 | Botros | |
| 2010/0215884 A1 * | 8/2010 | Kitada et al. | 428/41.8 |
| 2010/0279100 A1 * | 11/2010 | Heikkila et al. | 428/313.9 |
| 2011/0003094 A1 * | 1/2011 | Becker et al. | 428/17 |
| 2011/0003095 A1 * | 1/2011 | Becker et al. | 428/17 |
| 2011/0003916 A1 * | 1/2011 | Becker et al. | 524/68 |
| 2012/0237747 A1 * | 9/2012 | Tai et al. | 428/216 |
| 2013/0025089 A1 * | 1/2013 | De Smet et al. | 24/38 |
| 2014/0150398 A1 * | 6/2014 | Onbilger et al. | 57/210 |
| 2014/0203018 A1 * | 7/2014 | Kerep | 220/359.3 |

FOREIGN PATENT DOCUMENTS

| | | |
|---|---|---|
| EP | 1 760 380 A1 | 3/2007 |
| FR | 2 914 040 A1 | 9/2008 |
| GB | 2 100 185 A | 12/1982 |
| WO | WO 02/090812 A1 | 11/2002 |
| WO | WO 2005/103545 A1 | 11/2005 |
| WO | WO 2008/080715 A1 | 7/2008 |
| WO | WO 2009/040628 A1 | 4/2009 |

OTHER PUBLICATIONS

M. Hager et al., Design of Stell Cord Conveyor Belt Splices, Bulk Solids Handling, Nov. 1991, pp. 231-242, vol. 11, No. 4.

* cited by examiner

SPLICE FOR JOINTING STEEL CORD STRIPS ENCASED IN THERMOPLASTIC MATERIAL

TECHNICAL FIELD

The invention relates to a splice or joint for connecting steel cord reinforced belts or strips comprising thermoplastic polymers.

BACKGROUND ART

The use of steel cords to reinforce belts was probably first introduced to reinforce conveyor belts. Such belts basically consist of a set of steel cords encased in a rubber matrix. A steel cord conveyor belt runs on idlers and is tensioned between a receiving and discharge station for transporting materials. Evidently, the size of the steel cord for reinforcement of conveyor belts is relatively large—with diameters from 2 to 14 mm—as the acting forces are large. At the other end of the spectrum precision timing belts emerged reinforced with very fine steel cords, assembled out of steel filaments with a diameter of 40 µm to 150 µm but now encased in thermoplastic polymers in stead of rubber.

Recently, steel cords enjoy renewed attention for reinforcement of strips that are used in relatively static applications such as to reinforce pipes or hoses. See for example FR 2 914 040, EP 1 760 380, WO 2002/090812. But the use of flexible strips can be even more diverse in that it can also be used as a retrofit material to repair damaged concrete structures or to protect mooring lines from cutting.

While the word 'belt' in a technical context is mainly used in dynamic situations where movement or power is transferred, the word 'strip' seems to be more used in a static context to transfer force without movement. In what follows only the word 'strip' will be used, although it should be clear that for the purpose of this application, this may equally well refer to a 'belt'.

There has always been a need to connect the ends of a strip to one another in order to make it endless, or there was the need to joint several single pieces of strip together to make a very long strip. Such a connection is referred to as a 'joint' or a 'splice' which are considered synonyms for the purpose of this application. An ideal splice should not be noticeable in the strip. The splice must therefore have:

(A). Equal breaking strength as the strip;
(B). Equal stiffness in stretching as well as in bending as the strip itself;
(C). Equal dimensions as the strip (no thicker sections)
(D). Show equal dynamic fatigue as the strip;
(E). Should be relatively easy to implement on site.

In principle an ideal splice could be made when the length of the splice is unlimited. However, this is not practical.

Hence, making practical splices is always compromising between the different requirements (A) to (E) mentioned above. One type of splice may therefore be perfectly fit in one application, but not for connecting another kind of strips in another application. The following splice methods are known:

Splice by means of mechanical fasteners: a row of clamps are attached to the edge of the belt that is cut perpendicular to its length. A connecting rod is introduced into the inter-digitised eyelets formed. This kind of splice is used for fabric reinforced types of strips. It can not be used for strips with mainly axial reinforcement (the clamps tear out). As the splice is like a hinge, it is more flexible than the strip itself.

Overlap splice: the ends of the strips are overlapped and are vulcanized or glued to one another. This kind of splice is sometimes used to make rubber tracks endless. It has an increased bending stiffness in the splicing area because the two cord planes of both ends do not coincide and form a stiff double layer.

Interlocking splice: the ends of the strips are cut in the plane of the strip according a pattern with protrusions and recesses that fit into one another (like a dovetail connection). Afterwards the splice is vulcanized or glued or molten together. See for example WO 2009/040628.

The following splices are described in the ISO 15236-4 standard.

Finger splices are splices in which the ends of the strips are cut into a matching saw tooth pattern. The 'fingers' are afterwards vulcanized to one another. It is mainly used for fabric reinforced belts or strips, hence is less appropriate if only longitudinal oriented steel cords are present.

In an 'Interlaced stepped splice' cord ends from one strip are arranged—'interlaced'—between cords of the other strip end and subsequently covered with rubber or polymer or glued together. 'Cord end' is to be regarded as that part of the cord that is in the splice. The place where the cord stops is called the 'butt end'. The butt ends of the cords usually finish at regular positions in the splice hence its name of 'stepped splice'. An 'interlaced stepped splice' can thus be defined as a splice wherein the number of cords in the splice area is always larger than the number of cords in the strip. Such a splice has a very good static strength (the splice can be stronger than the belt) but shows an increased stiffness in the splice area. Stepped interlaced splices can be used if the strip has less than about 50% linear packing density. With 'linear packing density' is meant the ratio of the sum of all cord diameters to the total width of the strip. In case of a larger linear packing density, either some cords will have to be cut at the splice entry from both belts in order to accommodate space for the inserted cords leading to a loss of strength or the splice area can be made broader than the strip in order to accommodate the increased number of cords.

A 'plain stepped splice' can be defined as a splice wherein the number of cords within the splice remains equal to or smaller than the number of cords in the strip. In other words: the cord butt ends of both strips abut to one another. Different lay-out patterns are possible such as an 'organ pipe splice' (having a repeating 01230123 . . . pattern, the numbers indicating the step length of the cord ends of one strip in the splice) or a 'fir tree splice (having a repeating 01232100123210 . . . ) pattern. Such splices are difficult to discern from the strip itself in terms of bending stiffness, axial stiffness and section. However, they show a lower strength compared to 'Interlaced stepped splices'.

The inventors were primarily concerned with finding good splices of the 'interlaced or plain stepped splices' for strips reinforced with steel cords and encased in a thermoplastic polymer material. Although there is an extensive literature on how such splices are to be constructed for rubber steel cord reinforced belts, little exists for thermoplastic steel cord reinforced strips. For the former, a good overview can be found in "*Design of Steel Cord Conveyor Belt Splices*" by M. Hager and H. von der Wroge in "Belt Conveyor Technology, I/94" out of "The Best of Bulk Solids Handling 1986-1991" published by Trans Tech Publications.

Basically, there are two aspects to a stepped splice:

There is the mechanical aspect wherein the lay-out scheme of the splice plays a mayor role. Indeed, by seeking different interlacing patterns (for 'interlaced stepped splices') or abutment arrangements (in 'plain stepped splices) an improvement in splice performance can be obtained.

On the other hand it will be clear that in the kind of splices envisaged, no direct connection is made between steel cords from the one strip to the steel cords of the other strip. Hence all force has to be transferred from the cords in the one strip to the cords of the other strip by mediation of the polymer that is in contact with the steel cords. Ergo two factors will be crucial in this transfer: the strength of the anchorage of the steel cord to the polymer and the strength of the polymer.

Although both aspects have a high interaction with one another and can not be fully separated from one another, the focus of this application is on the second, chemical aspect and more in particular how an optimal chemical bonding can be implemented in a splice.

An inventive lay out scheme is the main subject of a co-pending application of the same applicant filed on the same day as this application and covers the splice from the more mechanical viewpoint.

DISCLOSURE OF INVENTION

It is therefore an object of the invention to provide a splice between two strips that shows optimal splice behaviour in terms of—in decreasing order of importance—flexibility, shape, strength, dynamic behaviour and ease of implementation. It is a second objective of the invention to define the proper polymers that must be used in the splice area. It is a further object of the invention to define the optimal concentration of those polymers.

Basically the invention concerns a splice for connecting a first strip to a second strip. The strips comprise steel cords that are embedded in a matrix of strip polymer.

With a 'steel cord' is meant any kind of wire wherein steel in the form of filaments is present including also the steel cord that consists of one single steel filament. By preference the steel is a plain carbon steel although stainless steels are not excluded per se. Such plain carbon steel has an exemplary composition with a minimum carbon content of 0.65%, a manganese content ranging from 0.40% to 0.70%, a silicon content ranging from 0.15% to 0.30%, a maximum sulphur content of 0.03%, a maximum phosphorus content of 0.30%, all percentages being percentages by weight. There are only traces of copper, nickel and/or chromium. The carbon content influences the strength attainable by the filaments so in order to reach the highest possible strength steel filaments with carbon contents of around and above 0.80% carbon are preferred.

The filaments are by preference formed by wire drawing, which is a cold forming process in which the tensile strength of the steel is further increased. In this way tensile strengths of above 2500 N/mm$^2$ are commonly obtained. Nowadays, very fine filaments with strengths in excess of 3700 N/mm$^2$ and even above 4000 N/mm$^2$ are being produced routinely. However, in relation to the splice of the invention, there is no need to go above this limit: as the strength needed for the strip can be obtained with ever finer filaments, the contact area for transfer of force from one strip to the other also diminishes. Hence, higher strength filaments will make it necessary to make the splice longer to compensate the diameter reduction. The described splices still worked well with tensile strengths in excess of 2500 N/mm$^2$, which is quite above what is common in the field.

In many cases the steel filaments will be coated with another kind of metal or metal alloy. However, this is not a prerequisite of the invention: it works equally well with uncoated, bare steel wires. Wires are coated for a number of reasons such as to improve drawability, to prevent corrosion of the steel or to increase adhesion with a polymer.

For example the wires can be coated electrolytically with brass having a composition of between 62.5 and 75 wt % copper, the remainder being zinc. The total coating mass is between 0 to 10 g/kg. Such a coating brings a very good adhesion with rubber with it. It is noted by the inventors that such coating will also work in their invention although its presence is not mandatory to the invention.

Or the wires can be coated with zinc. Zinc is applied for corrosion protection or for adhesion with rubber or for both. The coating mass ranges from 0 to 100 g of zinc per kg of wire. The zinc can be applied onto the wire by means of an electrolytic process or by means of a hot dip process, followed or not followed by a wiping operation in order to reduce the total weight of the zinc. Because of the corrosion protection of zinc and the presence of an iron zinc alloy layer that forms during the hot dip operation, the latter coating type is preferred.

Other coating types such as ternary alloy coatings are equally well possible the only requirement being that the coating must be metallic in nature.

Steel filaments can be assembled into steel cords in many different ways. The most simple is of course if filaments are bundled together in a bundle of mutually parallel wires. When such a bundle is twisted around its own axis with a certain lay length it becomes a single lay strand. Strands can also be assembled by adding layers of filaments to a core filament or core strand, each layer having a specific lay length or direction that differs from the layer below. Strands themselves can also be assembled together with a certain lay length and direction which results in a rope.

Only in case there is absolutely no chemical interaction between the cord's surface and the polymer an influence of the surface structure of the cord—that depends on the construction type of the steel cord—on the anchorage force can be observed. Rougher surfaces will lead to a better mechanical anchoring of the polymer in the steel cord. See for example WO 2005/103545. As in the invention the anchorage is predominantly of a chemical nature, the construction type of the steel cord has a minor influence on the invention. In this application with 'anchorage' is meant the total of both the mechanical mechanism as well the chemical bonding that holds a steel cord in a polymer. The terms 'chemical bonding' and 'adhesion' will be treated as meaning the same.

Hybrid steel cords in which steel filaments and other natural or man-made fibres are assembled together can also be used, provided enough metallic surface remains within reach of the polymer.

The polymer that is used for the strip matrix is of a thermoplastic nature. Such polymer will melt under the influence of heat and upon cooling it will solidify in a glassy or semi-crystalline state. Typical polymers envisaged for this invention are:

Polyolefin polymers which are polymers of which the monomer is an alkene. Well known examples are polyethylene (PE), polypropylene (PP), polybutylene, and higher olefinic polymers. Co-polymers of ethylene, propylene, 1-butene, 2-butene, 1-pentene, 1-hexene, 1-heptene and 1-octene and isomers thereof with each other and with other olefinically unsaturated monomers can be added to it.

Olefinically unsaturated aromatic polymers selected from the group comprising polystyrene (PS) and styrene compatible copolymers.

Polyester polymers selected from the group comprising polyethylene terephthalate (PET) or polybutylene terephthalate (PBT) and terephthalate copolymers Polyamides (PA), or more specifically nylons such as nylon 6.6, nylon 6, nylon 6,12 and the other types commonly known in industry;

Polyurethane but then only thermoplastic polyurethane (TPU).

The splice polymer comprises a base polymer into which a compatible co-polymer is mixed. The base polymer can be identical to the strip polymer. Alternatively the base polymer can be a thermoplastic polymer different from that of the strip polymer but then still one out of the family of possible strip polymer materials mentioned above. Still another alternative is that the strip polymer is a mixture of the same polymers as the splice polymer but possibly in other ratios of mixture. It is of course also possible that the strip polymer is the same as the splice polymer. However, as the splice polymer will in general be of a more complex nature hence more expensive the latter embodiment may not be the most cost effective.

Co-polymers that are suitable for mixing into the base polymer are grafted co-polymers, block co-polymers or random co-polymers that are functionalised in order to obtain adhesion to steel cords.

Grafted co-polymers are polymers wherein substituent, functionalised groups are attached to the backbone of a polymer which is by preference the base polymer. Not all of the base polymer must be grafted: it suffices if only part of the base polymer chains are grafted. The substituent groups can be attached through reaction with unsaturated aliphatic acids, unsaturated aromatic acids, acid anhydrides, esters, alcohols or combinations thereof. The substituent groups introduce polarity into an otherwise non-polar backbone and thereby increase adhesion to the metallic steel cord substrate.

More preferred, the grafted co-polymer is an acrylic acid or methacrylic acid functionalised polymer of polyolefins such as polypropylene, polyethylene, or polyesters such as polyethylene terephthalate, polybutylene terephthalate. Equally preferred are maleic anhydride functionalised polymers of polypropylene, polyethylene, ethylene-propylene rubber, or polyamides or polyurethanes.

Alternatively the co-polymer can be introduced into part of the base polymer chains as block co-polymers. In this case in part of the base polymer, blocks (series of two or more monomers) of functionalised co-polymers are introduced into the chain of the base polymer. Alternatively the functionalised monomers of the co-polymer can be introduced in a random manner into the base polymer backbone, which is referred to as random or statistical co-polymers. Again it is not needed that all of the base polymer chains comprise block or random co-polymers. It suffices that a sufficient number of the base polymer chains have co-polymer monomers introduced in their backbone either in blocks or at random. I.e. the block or random co-polymers can be intimately mixed with the base polymer.

When block or random co-polymers are used, the monomers originate by preference from unsaturated esters such as selected out of the group of vinyl acetate, alkyl-acrylate, alkyl-methacrylate. Alternatively, said co-polymers may originate from unsaturated acids or acid anhydrides such as acrylic acid, methacrlyic acid, butylacrylic acid.

The above mentioned splice polymer materials all have the same objective as to increase the chemical bonding or adhesion between the polymer and the steel. Indeed when considering a single steel cord that is pulled out of a strip the force needed to pull such single wire out of the strip increases linearly with the concentration of the functionalised co-polymer until the adhesion is so high that the steel cord breaks.

It was therefore much to the surprise of the inventors that the strength of the splice does not linearly increase with the amount of the functionalised co-polymer in the splice polymer. This goes totally against what the skilled person would expect. Indeed, the splice strength showed an optimum as a function of amount of functionalised co-polymer that was not reached at the highest tested concentration of the co-polymer but at a lower concentration!

The inventors teach that the optimal concentration of functionalised polymer can be found by observing the yield behaviour of the splice. The splice with the optimum concentration is that splice wherein a 'mixed mode' of yielding can be observed: part of the steel cords break while the remaining part of the cords slide out of the splice polymer without fracturing. If all of the cords glide out of the splice area without fracturing, the amount of functionalised co-polymer is insufficient. On the other hand if an amount of functionalised co-polymer is added wherein all cords in the splice break, part of this amount is superfluous and unexpectedly this amount does not contribute further to the splice strength. The inventors found that this method offers one way to find the optimum fraction of co-polymer in the splice polymer.

Specifying the amount of functionalised polymer as a weight fraction is another way of indicating the optimal splice polymer. However, this amount strongly depends on the degree of grafting of substituent polar groups in the co-polymer or on the ratio of substitution of functionalised monomers in the co-polymer. This is strongly dependent on the fabrication method of the functionalised co-polymer and is difficult to determine precisely.

Nevertheless the inventors estimate that—in the case of a grafted co-polymer—the optimum weight fraction of said grafted co-polymer is between 20 and 100%, while the degree of grafted substituent polar groups on the co-polymer itself is between 0.0001% and 1%. This means that between 1 in 1 000 000 to about 1 in 100 of the co-polymer side groups are substituted by polar groups. The higher the grafting degree, the lower the weight percentage of the grafted co-polymer in the splice material can be. If the grafting degree is 0.1%, normally 2 to 10 wt % of grafted co-polymer will suffice to obtain the desired level of adhesion. If the grafting degree is 0.01%, 20 to 100 wt % of grafted co-polymer will be needed. In practise a degree of grafting higher than 1% is rarely obtained. The inventors found that an amount in weight of between 40 and 70 wt % of grafted co-polymer is most preferred for commercially available grafted co-polymers. The optimal region could be narrowed to about 60 to 70%. One technique for grafting polymers is to co-extrude the base polymer with unsatured aliphatic acids, unsaturated aromatic acids, acids, anhydrides, esters, alcohols or combinations thereof.

Alternatively, when block or random co-polymers are used, the ratio of substitution of monomers in the base polymer will be higher as such co-polymers are prepared by in-situ polymerisation. The substitution ratio is there 2 to 10%. Hence, a lower weight fraction of between 2 to 20 wt % of block or random co-polymer in the base polymer suffices to obtain the desired level of adhesion.

Use of a mixture of co-polymer and base polymer as a splice polymer is preferred for plain or interlaced stepped splices. Particularly in the case of plain stepped splices, the use of such a mixture is very advantageous as there the common length between the steel cords in the splices is lower than in the case of interlaced splices. The common length 'CL' in a splice is the sum of the length of the cord sections of the first strip that lay directly adjacent to cord ends of the second strip. Clearly the common length is identical when first and second strip are exchanged. If one cord of the first strip is situated in between two cords of the second strip, the section of the one cord that are adjacent to both two cords is counted double. Two adjacent cord sections in a splice originating from cords of one strip do not contribute to the common length.

The length 'L' of the splice is of course also important in determining the strength of the splice. The length 'L' of the splice is that distance measured parallel to the spliced strips between the two most extreme cord ends of any one of the two strips. For a given splice lay-out the common length 'CL' will scale with the length 'L' of the splice:

$$CL = \phi \times L \times N$$

wherein 'N' is the number of cords in the strip (the maximum should be taken if the number of cords in first and second strip is not equal). '$\phi$' is determined by the lay-out of the splice: for a plain stepped splice $0 < \phi \leq 1$, while for an interlaced splice $\phi$ is larger than 1.

The longer this splice length 'L' is the longer the common length 'CL' between steel cords ends and hence the higher the splice strength will be. The splice strength is of course also determined by the anchoring force by which the cords are held in the strip.

The anchoring force is determined by pulling out one single steel cord out of a strip of (splice or strip) matrix material over a test length 'l'. This is done by taking a piece of strip (with the N-cords encased parallel to one another in it), covering the middle part of the strip over a length 'l' perpendicular to the strip, selecting a cord that is not situated on the edges (i.e. a central cord, cords on the edges only are held from one side) and liberating this cord from the strip except for the middle part of length 'l'. Then the selected cord is singled out at one side of the coverage while at the other side all remaining cords are cut except the selected cord. After removing the coverage the selected cord is pulled in axial direction out of the strip while the maximum force $F_{max}$ needed therefore is measured. Dividing $F_{max}$ by 'l' gives an anchoring force '$f_a$' expressed in newton per millimeter (N/mm).

The inventors found that the criterion for preferred breakage pattern of the splice can also be expressed in a more quantitative but totally equivalent way. Preferred breakage patterns occur when the total anchoring force in the splice is larger than the breaking load '$BL_{strip}$' of the strip. In formula:

$$BL_{strip} < CL \times f_a/2$$

Then at least one of the cords will show breakage. Note that the divider '2' in the formula originates from the fact the common length of the singled out cord in the anchoring force test described above is '2×l'.

Alternatively, the inventors found that the total anchoring force in the splice should not be larger than twice the breaking load of the strip, as then all cords break and no favourable distribution of forces by slipping occurs i.e.:

$$CL \times f_a/2 \leq 2 \times BL_{strip}$$

Increasing the strength of the splice above $2 \times BL_{strip}$ is superfluous and does not help to improve the overall splice strength. When the total anchoring force in the splice is larger than twice the breaking load of the strip, all cords will break in a test-till-break of the splice.

In what follows the ratio $(CL \times f_a)/(2 \times BL_{strip})$ will be called the 'Splice Quality factor' SQf. It is thus preferred that the SQf is larger than 1. It even more preferred that the SQf is between 1 and 2.

As the common length 'CL' is proportional to the length of the splice 'L' it follow that too long a splice length will lead to all wires being fractured which is—strangely enough—not the most preferred situation.

The length of the splice can also be related to the critical length of the steel cord. The critical length '$L_c$' of a steel cord in a certain strip or splice polymer 'matrix' is that length for which the anchoring force equals the breaking load '$F_b$' of the cord in the matrix material: $L_c^{matrix} = F_b/f_a$. I.e. it is that embedment length of steel cord when the steel cord will fracture rather than being pulled out of the strip or splice.

The splice length 'L' can be expressed relative to the critical length of the splice material '$L_c^{splice}$'. By preference 'L' is larger than two to three times the critical length of the cord in the splice material '$L_c^{splice}$'. Most preferred is if the splice length 'L' is larger than four times the critical length '$L_c^{splice}$'. By preference the splice length 'L' is shorter than seven or, even more preferred, six times the critical length '$L_c^{splice}$'. Longer splice lengths lead to all fractured cords and no gliding cords.

The above explained principles equally apply for a plain stepped or an interlaced stepped splice.

In case of a plain stepped splice a breaking load of the splice that is larger than half of the lower breaking load of any one of said first and second strip can be obtained by applying the principles explained above. Splice strengths larger than 55% or even larger than 60% of the strip breaking load can be obtained on plain stepped splices. As the plain stepped splice is very similar in strength and bending stiffness to the strip itself, the splice can be processed without any interruption in the process using the strip e.g. when winding around a tube, flexible pipe or mooring rope.

In case of a interlaced stepped splice the breaking load of the splice can even be higher depending on the lay-out of the splice. Splice strengths in excess of 60% of the lower breaking load of any one of said first and second strip can be obtained. Values above 70, or 80 or even 90% of the breaking load of the strips are possible.

Finally a strip that comprises any one of the above described splices is also claimed. The splices can advantageously be used to overcome problems associated with increased length requirements such as production length limitations (e.g. because the take-up unit can not take the full length of strip) or transport limitations (e.g. when the total length needed can not be transported on a single carrier as in the case of a conveyor belt).

BRIEF DESCRIPTION OF FIGURES IN THE DRAWINGS

MODE(S) FOR CARRYING OUT THE INVENTION

In a first preferred embodiment the inventors spliced two strips containing 54 cords extruded in parallel in High Density Poly Ethylene (HDPE, Eltex Tub 172 obtained from Solvay Polyolefins). The cords were steel cords of the type 12LE with three filaments of 0.28 and 9 filaments of 0.31 mm assembled together in a single lay as described in WO 2008 080715. The cord has a breaking load of at least 2400 N and a diameter of 1.23 mm. The average tensile strength of the wires is 2680 N/mm². The filaments were galvanised with a coating amount of 44 g/kg. The estimated overall strength of the strip was 54×2400N or 129.6 kN. The measured strength of the strip was 132 kN.

The width of the strip was 97 mm which results in a linear packing density of 68.5%, hence the space between the cords is less than the diameter of the cords. With such high packing density it is not possible to make an interlaced stepped splice without cutting cords before or after the strip. In addition an interlaced splice results in cords that are not straight through just before or after or in the splice area. Therefore the inventors opted for a plain stepped splice.

Figure 1:
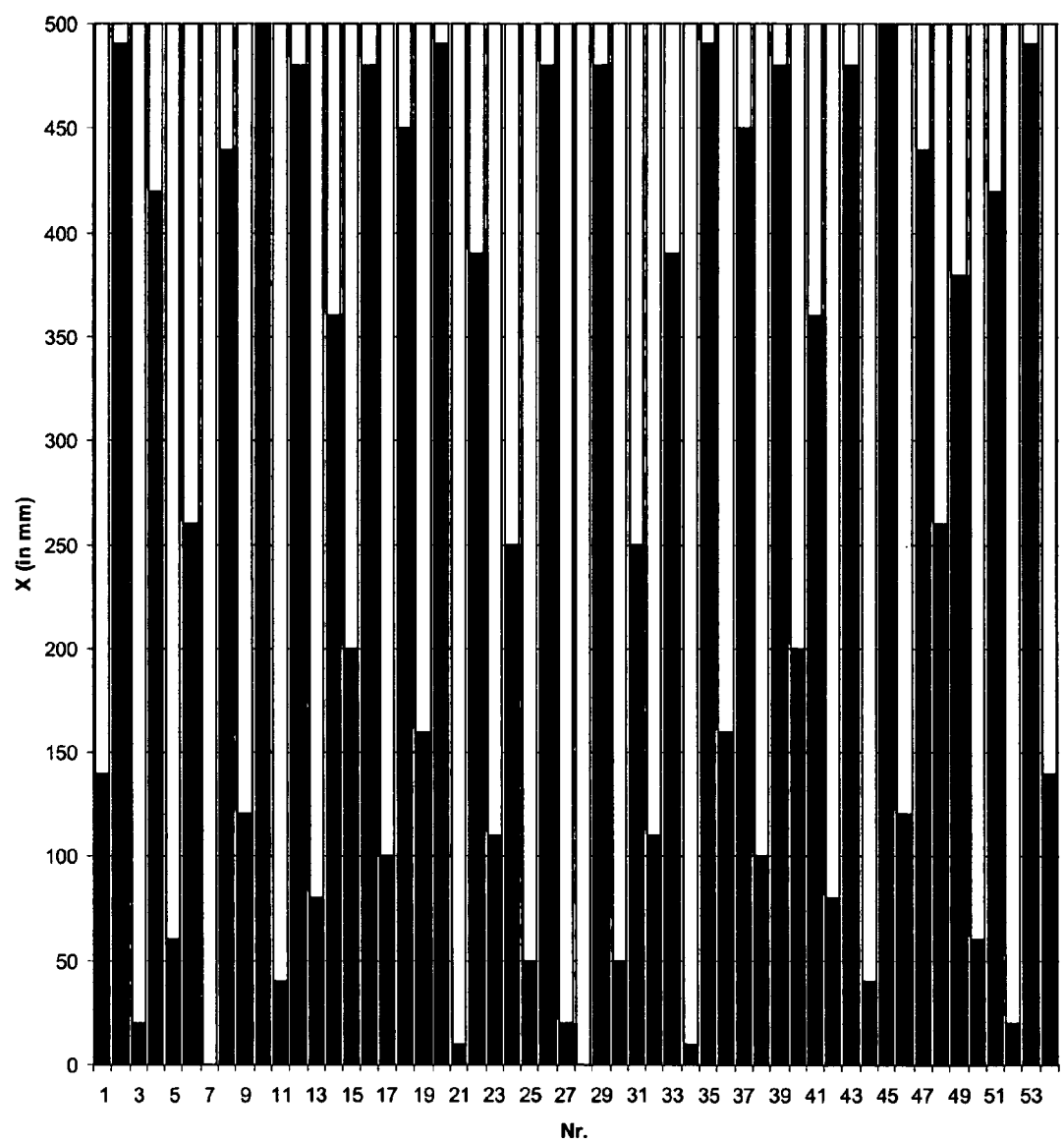
FIG. 1 shows a splice arrangement of the plain stepped splice type according which tests were performed.

In order to eliminate the variance due to the lay-out pattern of a stepped splice on the breaking load, one single arrangement of a plain stepped splice was selected for all experiments. This arrangement is represented in FIG. 1. There the position 'X' of different abutments is represented for each cord numbered from left to right in the first strip (the dark bars in the figure). The splice length 'L' is limited to 500 mm in total. The common length of this arrangement is 17600 mm or 35.2 times the splice length l'. The lay-out factor 'φ' is 65% (i.e. smaller than 1) for this plain stepped splice. The cutting of the cords in the second strip (the white bars in the figure) is complementary to that of the first strip. The abutments were chosen in a 'random' way such that the no two abutments come too near to one another.

The making of the splice starts with cutting the strips under 90° angle. Then on both strip ends, the entire HDPE casing is removed over 500 mm by stripping. This goes very easily as the HDPE only mechanically anchors to the cords. The steel cord ends are then cut to the length of the scheme where the base line is taken at the HDPE coated strip edge. Both strips are straight aligned to each other in a mold. A grooved sheet of splice polymer material with 54 round grooves of about 1.1 mm width and with a length of 500 mm is prepared and put in the mold. The splice is built up by alternatively pushing cords from the first and second strip end into the grooves. The steel cords tend to snap into the grooves and are held in this way. Once all cord ends in place, the splice is covered with a second sheet of splice polymer and the mold is closed. The mold is heated and pressurised by putting it into a hydraulic press. Heating is up to the melting temperature of the HDPE i.e. about 130° C.

As a grafted co-polymer for mixing the splice polymer 'Yparex®' obtained from DSM was used. Yparex® is a maleic anhydride grafted polyethylene. The degree of grafting is estimated to be between 0.001% to 2%. Yparex® was mixed into the HDPE base polymer by extrusion in different weight ratios: 0, 20, 40, 50, 60 and 100% and extruded into sheet. These mixtures were then used as splice polymer in the splice as described before.

Of the splice polymer material also a strip was made to evaluate the adhesion in the way described before (see paragraph [0044]). The following results (Table I) were obtained on the 12LE cord:

TABLE I

| (1) Nr. | (2) Yparex® content (wt %) | (3) Adhesion $f_a$ (N/mm) | (4) SQf | (5) $L_c^{splice}$ (mm) | (6) $BL_{splice}/BL_{strip}$ (%) | (7) STD (%) |
|---|---|---|---|---|---|---|
| 1 | 0 | 3.4 | 0.23 | 706 | 34.0 | 4 |
| 2 | 20 | 8.1 | 0.54 | 296 | 42.5 | 5 |
| 3 | 40 | 15.1 | 1.00 | 159 | 51.0 | 5 |
| 4 | 50 | 22.5 | 1.50 | 107 | 55.5 | 5 |
| 5 | 60 | 20.0 | 1.33 | 120 | 62.0 | 5 |
| 6 | 100 | 32.4 | 2.16 | 74 | 54.5 | 5 |

Figure 2:
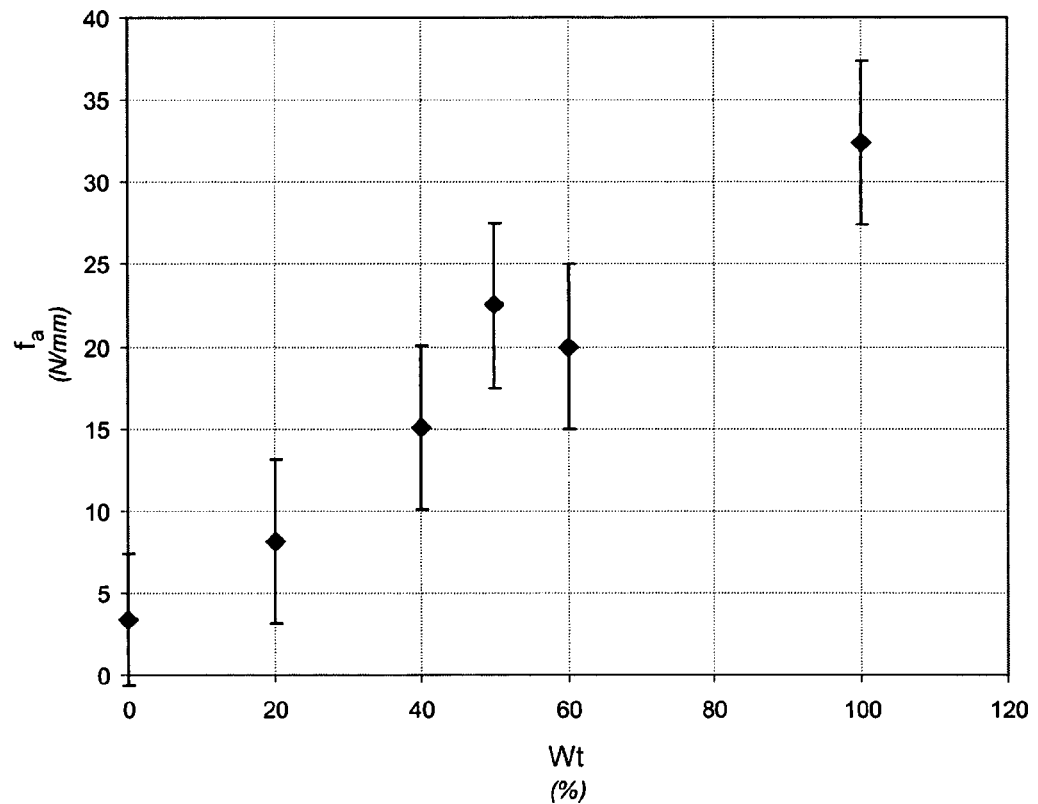
FIG. 2 shows the increase in anchoring force with increased weight percentage of co-polymer in the splice polymer.

Each time at least three individual results were averaged to determine '$f_a$' (column (3)) of the splice polymer material. The column (5) mentions the critical length $L_c^{splice}$ that is $F_b/f_a$. Note that the critical length of the strip material (the pure HDPE) is 706 mm which is above the 500 mm length of the splice. The results are also represented in FIG. 2, wherein the pull-out force shows a clearly linear behaviour with increasing amount of grafted co-polymer in the splice polymer.

Figure 3:
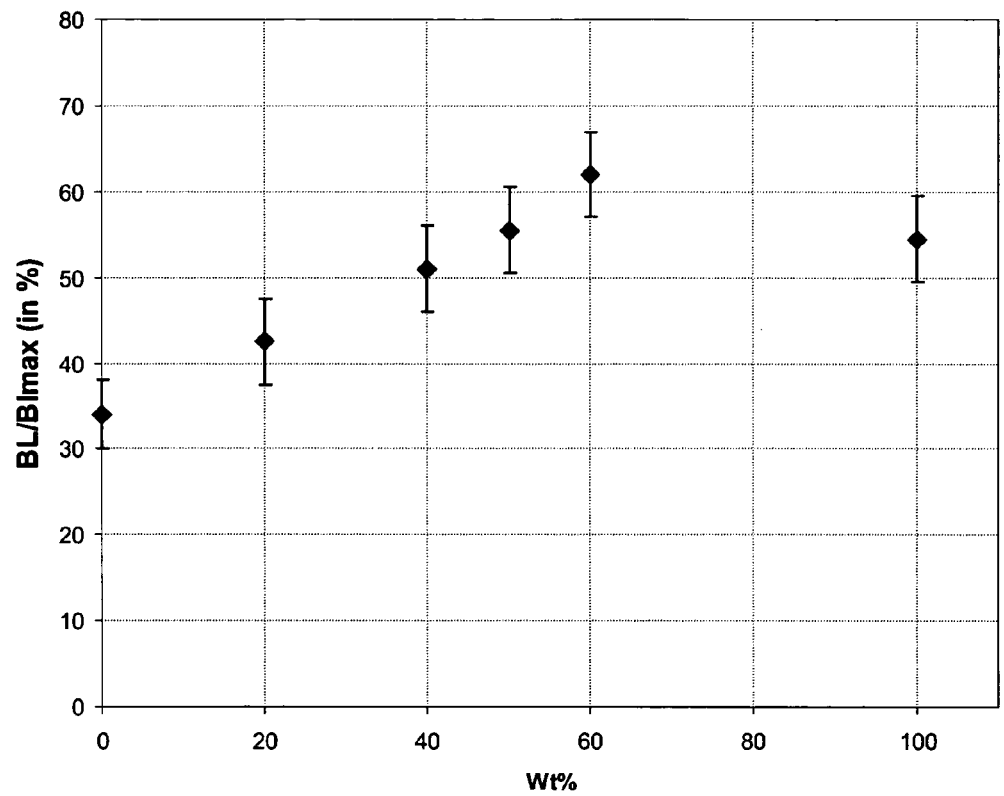
FIG. 3 shows the splice strength which was obtained for various weight percentages of co-polymer in the splice polymer.

It was therefore a big surprise to the inventors that this linear trend is not found back in the relative strength of the splice '$BL_{splice}/BL_{strip}$' (column 6, expressed as a percentage) wherein '$BL_{splice}$' is the measured breaking load of the splice and '$BL_{strip}$' the measured breaking load of the strip. Indeed, although the splice strength initially rises with increased grafted co-polymer amount, there is a limit to this. The results in the sixth column of Table I are also shown in FIG. 3 wherein in abscissa the grafted co-polymer weight concentration is given, while in ordinate the strength of the splice relative to the measured strength of the strip is given. Each point is the result of at least three different splices that were tested to break. Extrapolating the trend at lower co-polymer concentrations to 100% would have led to a strength of 80% of the strip. However, this clearly is not obtained and a maximum is obtained with co-polymer concentrations that are lower than maximum.

When visually observing how the fracture occurred, the inventors noticed that splice breaks with the highest overall strength showed a mixed behaviour of sliding and breaking. The splices Nrs. 4 and 5 showed such favoured failure mode while in splices Nrs. 1 to 3 the steel cords did not break but were pulled out of the splice polymer. In splice Nr. 6 all cords were broken, no sliding occurred. The mixed fracture behaviour is characterised in that certain cords are torn out of the splice polymer (as the adhesion strength by which they are held is less than their breaking load) while others reach their maximum breaking load. By analysing the fracture, it is clearly visible what cords are broken and what cords have been torn out of the polymer without fracture. At the moment one cord snaps, the whole construction collapses. It is conjectured by the inventors that by having cords that glide out of the polymer, the force distribution in the splice is better and leads to higher overall strength. The gliding acts as a buffer to distribute the forces more evenly. However this is merely a hypothesis and should not be used to render the invention obvious.

Column 4 shows the Splice Quality factor $(CL \times f_a)/(2 \times BL_{strip})$. As explained in the description section, this ratio should preferably be larger than 1, but smaller than 2 for the favoured breaking behaviour of the splice which corresponds with what has been observed.

It is apparent that the splice length for the favoured splices Nr. 4 and 5 have a splice length 'L' that is larger than 4 times the critical length. If the splice length 'L' comes larger than 6 times the critical length all cords fracture (splice Nr. 6). However, the inventors believe that this favourable ratio has more to do with the specific splice lay-out and that other lay-outs may have different optimal ratios (reference is made to the co-pending application of the same applicant on the same day).

In a second preferred embodiment a similar series of experiments in a polyamide type of base polymer—Pipelon® obtainable from DuPont—was performed. Polyamide—due to the presence of polarity in its chains—has a higher chemical affinity to steel than the a-polar polyolefins. However, this is still insufficient to obtain a splice of sufficient strength. Therefore the inventors mixed Yparex® to it as an adhesive co-polymer in different amounts. A strip was extruded with identical cords in an identical number as in the first series of embodiments, but now made of Pipelon®. Splices were made with the same lay-out as in FIG. 1. Results are summarised in table II:

TABLE III

| Nr. | Yparex ® content (wt %) | Adhesion $f_a$ (N/mm) | SQf | $L_c^{splice}$ (mm) | $BL_{splice}/BL_{strip}$ (%) |
|---|---|---|---|---|---|
| 7 | 25 | 14.4 | 0.96 | 167 | 38.1 |
| 8 | 35 | 14.5 | 0.97 | 166 | 41.4 |
| 9 | 50 | 19.4 | 1.29 | 124 | 52.0 |
| 10 | 70 | 24.2 | 1.61 | 99 | 62.0 |

In splices Nrs. 7 and 8 the cords were torn out of the splice polymer without any cord breaking. Splices Nr. 9 and 10 showed the favourable mixed breaking behaviour. And again the splices with this fracture behaviour come out best. Again this favoured break behaviour corresponds to a Splice Quality factor between 1 and 2. Note that for splices Nrs. 9 and 10 the splice length 'L' of 500 mm is between 4 and 6 times '$L_c^{splice}$', while it is outside this range for splices 7 and 8.

Although from a chemical viewpoint mixing a polyamide with a polyolefin is a rather unorthodox approach, it unexpectedly turned out to work very well to obtain a suitable splice polymer. However, some Yparex® looses its activity when binding to the polyamide. That is why the substantial amounts of Yparex® are needed before the adhesion improves.

Other embodiments with other mixtures of co-polymers and base polymers as a splice polymer have been identified by the inventors:

TABLE III

The brandnames are registered trademarks of the indicated Producers.

| Base Polymer | Co-polymer type | Brandname (e.g. type number) | Producer |
|---|---|---|---|
| PE | Grafted | Escor (5000, 5050) | ExxonMobile Chemical |
| PE | Grafted | Nucrel (0403) | DuPont |
| PE | Grafted | Yparex (9401) | DSM |
| PE | Grafted | Orevac (9314) | Arkema |
| PP | Grafted | Orevac (18760) | Arkema |
| PP | Random | Fusabond (P MD353D) | DuPont |
| TPE | Block | Infuse (9100) | Dow Chemical |
| TPE | Block | Empilan | Huntsman |
| TPE | Block | Surfonic | Huntsman |
| TPE | Block | Teric PE | Huntsman |
| TPE | Random | Hydrol | Huntsman |
| TPE | Random | Teric BL | Huntsman |

The inventors are convinced that optimised mixtures can be found wherein the splices show the favoured fraction behaviour as described above.

In further trails, the influence of the lay-out scheme was further investigated. A strip was made comprising 15 steel cords of type 12LE, pulling 2700 N at break. The steel cords were incased in Eltex TUB172 HDPE. The strip had a breaking load of $BL_{strip}$ of 39 970 N and a width of 30 mm. Four different splices were made.

Figure 4A:
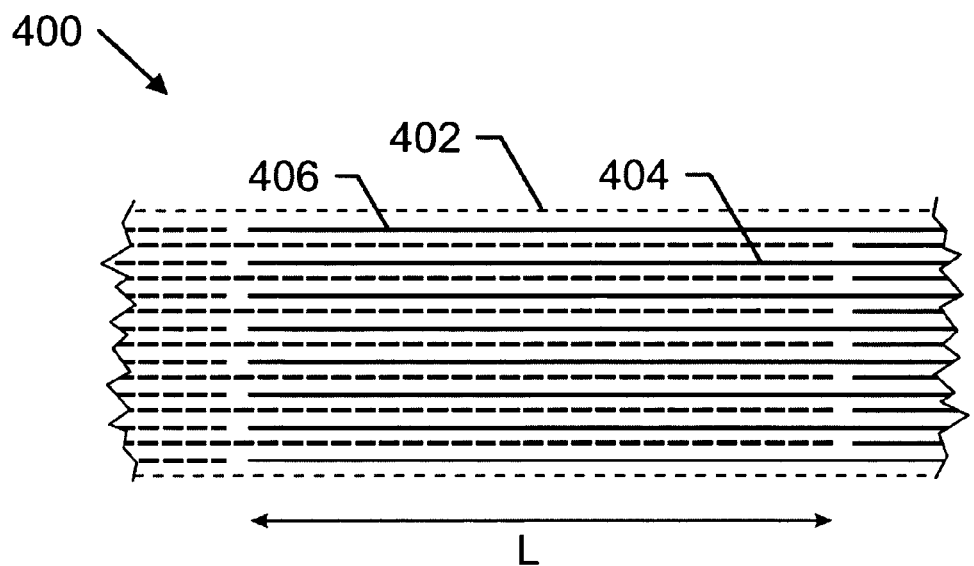
FIG. 4a shows the plain stepped splice with the longest possible common length.

Splices 11 and 12 were of the type exemplified in FIG. 4a, i.e. it are splices 400 of the simplest possible plain stepped type wherein odd cords are cut at the one end of the splice in the first strip, while the even cords run through in the splice while in the second strip even cords are cut at the other end of the splice while the odd cords 404, 406 run through to form the splice. The total length of the splice 'L' was 500 mm resulting in a common length of 14×500 or 7000 mm. The lay-out factor 'φ' is therefore 93%. This is the plain stepped splice with the largest possible common length.

The splice polymer 402 used for splice 11 was identical to the strip polymer material i.e. Eltex TUB172 HDPE.

The splice polymer 402 used for splice 12 was a mixture of polyamide Pipelon® with 60% by weight of Yparex®.

Figure 4B:
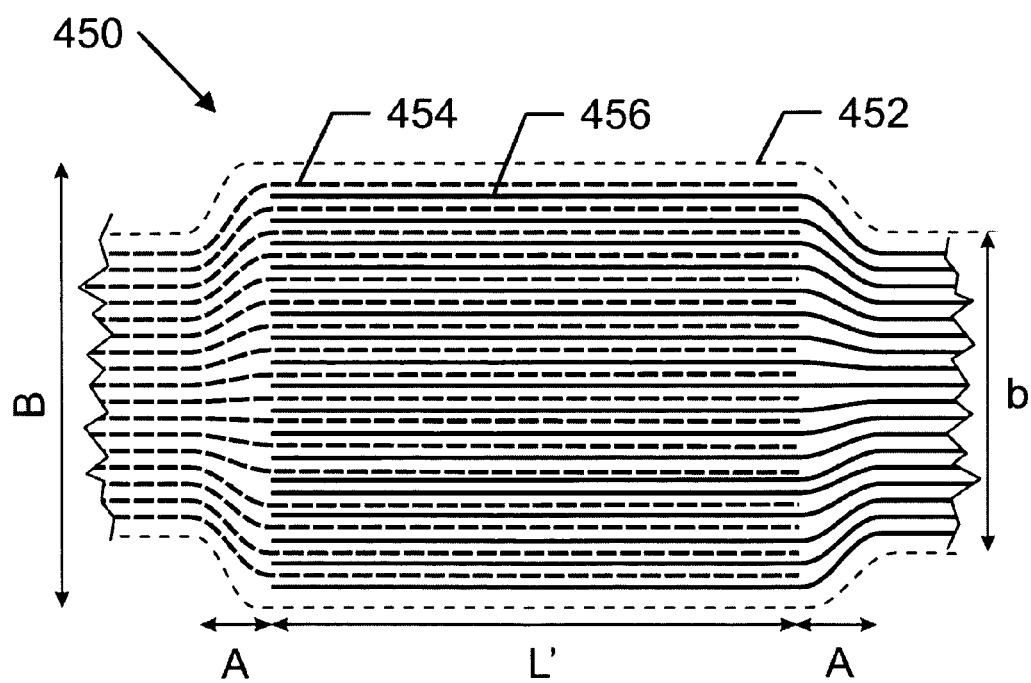
FIG. 4b shows the interlaced stepped splice with the longest possible common length.

Splices 13 and 14 are of the interlaced stepped splice type as depicted in FIG. 4b, 450. In the splice the cords of both strip ends 454, 456 are freed over the same length L'+2A. The cord ends 454, 456 are put side by side in the splice thus yielding the interlaced splice with the longest possible common length of 29×450 or 13 050 mm. The length L' is only 450 mm as some of the cords had to be diverted in order to be able to accommodate the cords in the splice (as the packing density in the strip was 68.5%). As no cords were cut at the entry of the splice, the total width increased from 'b' 30 mm to 'B' 61 mm. The lay-out factor 'φ' for this splice is 1.93.

The splice polymer 452 of splice 13 was Eltex TUB172 HDPE, while the splice polymer for splice 14 was again a mixture of polyamide Pipelon® with 60% by weight of Yparex®.

The results of the test are summarised in Table V. Qualitatively, in the tensile test the cords were torn out of the splices 11 and 13 without any cord breaking: all cords were slid out of the splice. This is in line with an unfavoured SQf of below 1.

In splice 12 part of the cords were torn out while most of them broke. The SQf is a favoured 1.93. The reason why the strength of the splice is only 47% of the strength of the strip is due to the poor lay-out scheme: half of the cords of one strip end at the same place in the splice. When thinking away the odd cords in the left strip and the even cords in the right strip of FIG. 4a, one obtains an imaginary interlaced splice with 7 cords in the strip on the left and 8 cords in the strip on the right. The common length however remains unchanged, hence also the SQf. But then the splice strength $BL_{splice}/BL_{strip}$ would at least be 94%.

In splice 14 all cords snapped during the splice testing. Clearly the fracture is not favorable as the SQf is much higher than needed namely 3.59.

TABLE V

| Nr. | Splice polymer | Adhesion $f_a$ (N/mm) | SQf | $L_c^{splice}$ (mm) | $BL_{splice}/BL_{strip}$ (%) |
|---|---|---|---|---|---|
| 11 | Eltex TUB172 | 3.4 | 0.30 | 794 | 31 |
| 12 | PA + 60% Yparex | 22 | 1.93 | 123 | 47 |
| 13 | Eltex TUB172 | 3.4 | 0.56 | 794 | 52 |
| 14 | PA + 60% Yparex | 22 | 3.59 | 123 | 91 |

The invention is summarized in the set of claims attached hereto.

The invention claimed is:

1. A splice connecting a first strip to a second strip, both strips comprising parallel steel cords embedded in a matrix of strip polymer, said steel cords having ends in said splice, said ends of said steel cords are embedded in a splice polymer, both said strip polymer and said splice polymer comprising thermoplastic polymers,
wherein
said splice polymer comprises a mixture of a co-polymer and a base polymer, said co-polymer being a grafted co-polymer functionalised for enabling adhesion to said steel cords and, wherein a fraction of said grafted co-polymer in said mixture is between 20 and 100% by weight, excluding 100%, while a degree of grafting by grafted substituent polar groups in said co-polymer is between 0.0001% and 1%, said fraction of said grafted co-polymer in said mixture being sufficient to make at least part of the steel cords break in said splice while steel cords that do not break in said splice are pulled out of said splice in a test-till-break.

2. The splice according to claim 1 wherein said fraction of said grafted co-polymer in said mixture is less than needed to have all of said steel cords break in a test-till-break of said splice.

3. The splice according to claim 1 wherein said base polymer
- is a polyolefin polymer selected from the group comprising polyethylene, polypropylene, polybutylene, and higher olefinic polymers, co-polymers of ethylene, propylene, 1-butene, 2-butene, 1-pentene, 1-hexene, 1-heptene and 1-octene and isomers thereof with each other and with other olefinically unsaturated monomers or
- is an olefinically unsaturated aromatic polymer selected from the group comprising polystyrene and styrene copolymers or
- is a polyester polymer selected from the group comprising polyethylene terephthalate or polybutylene terephthalate and terephthalate copolymers or
- is a polyamide, or
- is a polyurethane.

4. The splice according to claim 1 wherein said grafted co-polymer comprises substituent groups grafted to a base wherein said base polymer
- is a polyolefin polymer selected from the group comprising polyethylene, polypropylene, polybutylene, and higher olefinic polymers, co-polymers of ethylene, propylene, 1-butene, 2-butene, 1-pentene, 1-hexene, 1-heptene and 1-octene and isomers thereof with each other and with other olefinically unsaturated monomers or
- is an olefinically unsaturated aromatic polymer selected from the group comprising polystyrene and styrene copolymers or
- is a polyester polymer selected from the group comprising polyethylene terephthalate or polybutylene terephthalate and terephthalate copolymers or
- is a polyamide, or
- is a polyurethane,
- said substituent groups originating from the group comprising unsaturated aliphatic acids, unsaturated aromatic acids, acid anhydrides, esters, alcohols or combinations thereof.

5. The splice according to claim 4 wherein said grafted co-polymer is one out of the group comprising acrylic acid or methacrylic acid functionalised polymers of polypropylene, polyethylene, polyethylene terephthalate, polybutylene terephthalate or the group comprising maleic anhydride functionalised polymers of polypropylene, polyethylene, ethylene-propylene rubber, polyamide, polyurethane.

6. The splice according to claim 1 wherein said strip polymer is the same as said base polymer.

7. The splice according to claim 1 wherein said strip polymer is a mixture of the same polymers as said splice polymer.

8. The splice according to claim 7 wherein said strip polymer is the same mixture as said splice polymer.

9. The splice according to claim 1 wherein said splice has a lay-out, and said lay-out of said splice is a plain stepped splice.

10. The splice according to claim 9 wherein a Splice Quality factor of said splice is larger than 1 and smaller than 2.

11. The splice according to claim 10 wherein said plain stepped splice has a breaking load that is larger than half of a lower breaking load of any one of said first and second strip.

12. The splice according to claim 9 wherein said plain stepped splice has a breaking load that is larger than half of a lower breaking load of any one of said first and second strip.

13. The splice according to claim 1 wherein said splice has a lay-out, and said lay-out of said splice is an interlaced stepped splice.

14. The splice according to claim 13 wherein said interlaced stepped splice has a breaking load that is larger than 60% of a lower breaking load of any one of said first and second strip.

15. The splice according to claim 13 wherein a Splice Quality factor of said splice is larger than 1 and smaller than 2.

16. The splice according to claim 15 wherein said interlaced stepped splice has a breaking load that is larger than 60% of a lower breaking load of any one of said first and second strip.

17. A strip comprising a splice according to claim 1.

18. The splice according to claim 1, wherein said fraction of said grafted co-polymer in said mixture is between 20 and 70% by weight.

* * * * *